United States Patent [19]

Hertz

[11] 3,779,851
[45] Dec. 18, 1973

[54] METHOD OF FABRICATING THIN GRAPHITE REINFORCED COMPOSITES OF UNIFORM THICKNESS

[75] Inventor: Julius Hertz, San Diego, Calif.

[73] Assignee: General Dynamics Corporation, San Diego, Calif.

[22] Filed: Dec. 22, 1971

[21] Appl. No.: 210,694

[52] U.S. Cl.............. 156/309, 156/161, 156/163, 156/299, 156/306, 161/55, 161/57, 161/58, 161/141
[51] Int. Cl. ........................ C09j 5/00, B32b 5/12
[58] Field of Search................. 156/161, 163, 299, 156/306, 309; 161/55, 57, 58, 141; 264/108

[56] References Cited
UNITED STATES PATENTS

| | | | |
|---|---|---|---|
| 2,901,455 | 8/1959 | Jurras | 161/58 |
| 3,432,295 | 3/1969 | Frank et al. | 75/206 |
| 3,466,219 | 9/1969 | Schwartz | 161/57 |
| 3,711,934 | 1/1973 | Zorowski et al. | 29/445 |

Primary Examiner—Alfred L. Leavitt
Assistant Examiner—Robert A. Dawson
Attorney—John R. Duncan

[57] ABSTRACT

A method of making high strength, low thermal expansion thin composite structures of uniform thickness is disclosed. A plurality of resin impregnated graphite fiber sheets are laminated together to provide composite preforms. A plurality of the preforms are then bonded together in a pseudoisotropic arrangement between parallel plates. The resulting structures are especially useful as substrates for flat or slightly contoured mirrors.

18 Claims, 2 Drawing Figures

PATENTED DEC 18 1973  3,779,851

INVENTOR.
JULIUS HERTZ
BY
John R Duncan
Attorney

METHOD OF FABRICATING THIN GRAPHITE REINFORCED COMPOSITES OF UNIFORM THICKNESS

BACKGROUND OF THE INVENTION

This invention relates to reinforced plastic composite structures and, more specifically, to methods of making thin composite sheet or plate structures of improved flatness and uniform thickness.

Recently, reinforced plastic composite structures have been developed for use in a wide variety of structural applications. These materials have a number of advantages over metal, ceramic or plastic structures. Composite materials, which may, for example, comprise graphite, carbon or glass fibers imbedded in a plastic matrix, generally have very high strength-to-weight ratios, and very low thermal expansion characteristics. These characteristics are highly desirable for several optical applications, among others. Very flat mirrors or precisely contoured mirrors are required in a number of optical instruments. The light weight and high stiffness of these materials make them highly desirable in portable optical devices and in optical devices to be used in outer space.

These materials have not, however, been entirely successful in certain applications requiring very flat or precisely contoured thin plates of very uniform thickness. Conventionally, composite materials are prepared by impregnating a plurality of sheets of the reinforcing fiber material with the resin, then shaping the material while curing the resin. Thermal stresses are set up in the material during the molding and curing steps which result in warping of the resulting composite plate. These stresses also change with temperature changes, so that even if a plate can be made flat at one temperature, it is likely to distort at other temperatures.

While it is possible to reduce distortion of flat composite plates by either making them thicker or laminating them to other structures, the increased thickness is undesirable for many applications and adds to the structure weight. Many optical devices, such as Baez or grazing incidence devices, may be dimensionally limited in substrate thickness to a thin plate. A thin sheet or plate also is superior in that there is a minimum temperature gradient across the thickness of the plate. This minimizes distortions due to thermal bending.

Attempts have been made to produce relatively flat small specimens by cutting the best areas from larger panels. However, this technique is very wasteful and produces only very small plates. Smoothing a surface by sanding has little utility, since the plate cannot be sanded beyond removal of surface glaze without reaching the imbedded fibers. Sanding into the fibers destroys plate symmetry, produces a non-uniform surface and increases the possibility of thermal distortion. Similar problems, of course, occur in the fabrication of precisely contoured spherical or parabolic mirrors.

Thus, there is a continuing need for an improved process for manufacturing very flat and precisely contoured thin plates from reinforced plastic composite materials.

SUMMARY OF THE INVENTION

An object, therefore, of this invention is to provide a composite material forming process overcoming the above-noted problems.

Another object of this invention invention to provide a method of manufacturing very flat or precisely contoured thin plates from composite materials.

Still another object of this invnention is to provide a method of manufacturing thin plates of highly uniform thickness from composite materials.

The above objects, and other, are accomplished in accordance with this invention by a method which comprises the steps of impregnating a plurality of thin sheets of a graphite fiberous reinforcing material with a synthetic resin, forming a number of preforms by laying up from two to 10 sheets and curing the resin while the sheets are held in a substantially flat arrangement, then bonding a plurality of the resulting preforms together in a pseudoisotropic arrangement to form the final flat plate.

DETAILED DESCRIPTION OF THE INVENTION

While any suitable number of sheets of the graphite reinforcing material may be laminated together to produce the preforms, preferably from two to 10 are used. Best results are generally obtained with from two to 10 sheets because of the accurate fiber alignment possible with this small number of sheets and the ease with which the resulting preforms can be slightly deformed during subsequent bonding operations. While these sheets may be laminated in any suitable orientation, for best results either a pseudoisotropic or unidirectional arrangement is preferred. All fiberous reinforcing material whether a fiber mat, a woven sheet or any other, has a direction of maximum strength across the sheet surface. Thus all fiberous sheets are directionally orientated to some extent.

In a unidirectional arrangement, all sheets have their fibers running in a single direction, or "0°." In a pseudoisotropic arrangement, the maximum strength direction of each fiber sheet is oriented with respect to the others to balance the preform strength and the sheets are balanced above and below a central plane through the laminate parallel to the laminate faces. For example, in a four-sheet pseudoisotropic preform, the sheets would be laminated with the two maximum strength lines at right angles to each other; that is a 0°/90°/90°/0° lay-up. With six sheets, the angular relationship might be 0/+60/−60/−60/+60/0 and with eight sheets, 0/+45/−45/90/90/−45/+45/0, etc. These preforms are likely to be slightly non-flat after the impregnating resin has cured. However, since these preforms are thin, they require extremely low loads for flattening. Thus, pseudoisotropic bonding of a number of preforms (either unidirectional or pseudoisotropic preforms) has been found capable of producing an extremely flat plate from a number of randomly near-flat preforms. Similarly, a plate having a precisely contoured spherical or parabolic surface may be formed from a plurality of preforms which individually are formed in nearly the desired shape, then are laminated against a precisely shaped surface.

Any suitable number of preforms may be bonded together to give a final thin flat or precisely contoured plate of a selected thickness. In general it is preferred that from two to 10 preforms be used. An optimum combination of plate stiffness and strength, together with lowest weight and thickness is generally obtained with plates having thicknesses of from about 0.05 to 0.25 inch. Best results are generally obtained with the maximum number of layers of the starting sheets and of the intermediate preforms, since this increases the isotropy (uniformity of properties) of the plate. The starting sheets are generally available in the 0.001 to 0.01 inch thickness range, so that preferred plates may contain from about 12 to 100 layers of these sheets. To obtain very flat plates, it is strongly preferred that a fully pseudoisotropic assembly be used. Both the directional orientation of the preforms should be balanced and the number and orientation of preforms above and below a central plane through the plate parallel to the plate surface should be balanced.

The graphite fiber sheets may be impregnated with, and bonded together by, any suitable resin during preform manufacture. Typical synthetic resins include polyolefins such as polyethylene an polypropylene; vinyl and vinylidene polymers such as polystyrene and polyvinylacetate; fluorocarbons such as polytetrafluorethylene and polyvinyl fluoride; polyamides such as polycaprolactam; polyimides; polyurethanes; polysulfides; polysulfones; polycarbonates; phenolic resins such as phenol-formaldehyde resins; polyesters; epoxy resins; silicone resins; alkyd and alkyl resins; polyquinoxalines; polyphenylquinozalines; polyimidazoquinoxalines; and mixtures and copolymers thereof. Impregnation may be accomplished by any suitable techinique, such as solution dipping, spraying, hot-melt coating, etc. The resin may be cured by any suitable technique. Resins which are thermally or catalytically cured are preferred, since they produce plates with very little residual solvent or other ingredients which might out-gas if the plate is used in a vacuum environment and they are easily cured in open or closed molds. Best results have been obtained with epoxy and polyimide resins. These produce a strong, rigid plate with excellent thermal stability. By properly selecting fiber types and resin matrices, it is possible to selectively vary the coefficient of expansion of the plates between about $-0.6 \times 10^{-6}$ in./in/F and $+20 \times 10^{-6}$ in./in.F.

Any suitable graphite fibers arranged in sheet form may be used as the reinforcing element. If desired, other reinforcing fibers may be added to enhance specific desired physical properties of the plates. Typical other fibers include boron, glass, asbestos and quartz fibers. The fiber sheets may have any suitable structure. Typically, sheets may be provided as mats of chopped fibers, woven fiber cloth-like sheets, etc. Generally, the fiber sheets should have thicknesses in the range of about 0.001 to 0.005 inch for best results. While individual fibers may have any suitable dimensions, generally diameters of from about 8 to 50 microns and lengths of from about 0.5 inch to continuous are preferred. Best results are generally obtained with so-called "prepreg" materials which consist of a single layer of parallel fibers or filaments coated with a resin or plastic matrix material, then partially curing the resin. Typically, an epoxy resin may be applied then partially cured to the stage in which it is tacky, then cured to the hard stage after preform assembly. The prepreg sheets are handled in the form of a continuous tape or web, or as cut sheets, spaced apart with intersheets having anti-stick surfaces.

After impregnation with the selected resin, the fiber sheets are assembled in the desired orientation and pressed between flat plates during the resin curve period. Typically, with epoxy resins, curing for a minimum of about 2 hours at a temperature of about 375° F give best results.

After the desired number of preforms are produced, they are bonded together in the selected pseudoisotropic arrangement to make the desired plate. Any suitable bonding technique may be used. Typically, adhesive bonding with room temperature bonding epoxics, such as EC–2216 (available from 3M Co.) may be used. Where adhesive bonding is used, it is preferred that the adhesive layer have a thickness less than about 0.002 inch. Plates having many thin preforms with very thin adhesive inter-layers are less subject to the "saddle" effect (transverse distortion) when distorted in the longitudinal direction. During adhesive curve, the assembled plate is preferably pressed between flat plates at a pressure of about 50 psig and temperature of about 60° to 150° F. Accurately controlled plate thickness is achieved by inserting metal stops or shims of accurate thickness between the pressing plates adjacent to the preform assembly.

While not always necessary, it is generally preferred that the preform surfaces be very lightly sanded to remove any surface glaze before they are bonded together to produce the composite plates. This sanding should not penetrate to the fibers within the preforms.

Where a finished flat plate is to be used as a mirror substrate, the final step is the formation of a suitably reflective surface coating. Any suitable coating or replication technique may be used. Direct polishing of the plate surface may provide a reflective surface suitable for some uses. However, it is preferred that a reflective surface layer be used for most applications, especially in the ultraviolet and/or X-ray ranges. Any surface layer suitable for a desired application may be used. Typically, a thin layer of low-expansion material, such as fused silica may be bonded to the plate, then ground and polished. A reflective metal coating, such as nickel, may then be applied, such as by vacuum evaporation. Or, a replication technique may be used, typically one in which a master optical surface is coated successively with evaporated silver, silicon monoxide, aluminum and silicon monoxide; the free surface of this assembly is bonded to a composite plate, then the assembly is parted from the master and the silver is dissolved away, leaving the overcoated aluminum surface exposed for high reflectance.

If desired, a reflective surface may be applied during manufacture of the composite plate. Typically, a master surface is plasma-sprayed with low-expansion material, then covered with the lay-up of composite material and cured. After parting from the master, the plasma-sprayed coating is ground and polished. Alternatively, a precured composite plate may be plasma-sprayed with a low-expansion material, then ground and polished.

BRIEF DESCRIPTION OF THE DRAWING

Details of the invention will be further understood upon reference to the drawing, wherein.

DETAILED DESCRIPTION OF THE DRAWING

Figure 1:
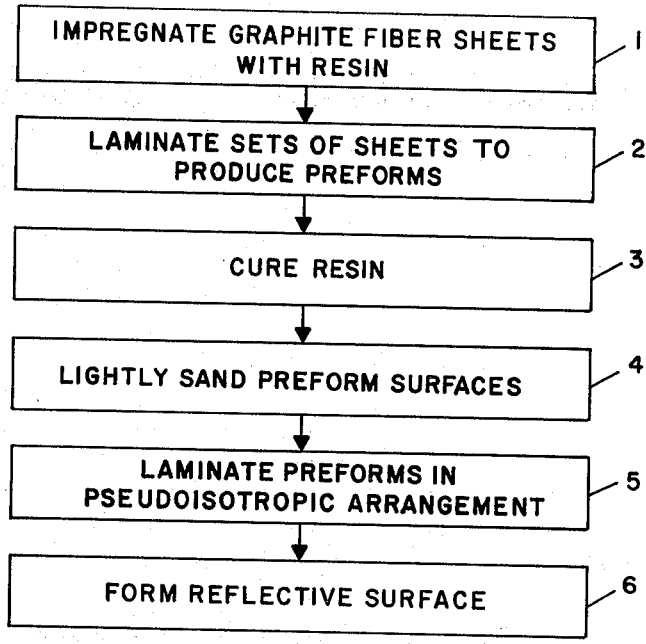
FIG. 1 is a block diagram flow sheet for the composite plate manufacturing process of this invention.

Referring now to FIG. 1, there is seen a flow sheet illustrating a preferred process of making a typical product, namely a thin, flat mirror of uniform thickness.

As discussed above, Step 1 consists of impregnating a plurality of sheets made up of primarily graphite fibers with a suitable synthetic resin. Next, in Step 2, groups of from two-eight of these impregnated sheets are bonded together in flat molds to form preforms. Preferably, the sheets are bonded in a pseudoisotropic arrangement. The resin is then cured as shown in Step 3 while the preforms are held flat.

While not always necessary, it is generally preferred that the surfaces of the preforms be very lightly sanded, as shown in Step 4, to remove the surface glaze, before bonding them together in Step 5.

The number of preforms necessary to produce a final plate of a selected thickness are then bonded together in a pseudoisotropic arrangement as illustrated in Step 5. While individual preforms are likely to be slightly non-flat, these distortions have been found to balance out when a number of preforms are combined, so that the resulting plate is very flat and has very uniform thickness.

Upon completion of Step 5, the plate is ready for use in any application requiring flat plates of high strength and low thermal expansion or distortion characteristics.

A preferred application for the flat composite plates produced by this process is in flat or accurately contoured mirrors for use in optical instruments, optical devices for use in outer space, etc. Thus, a preferred final step, Step 6, involves the formation of a highly reflective surface on the plate. This reflective surface may be formed in any suitable manner, as discussed above.

Figure 2:
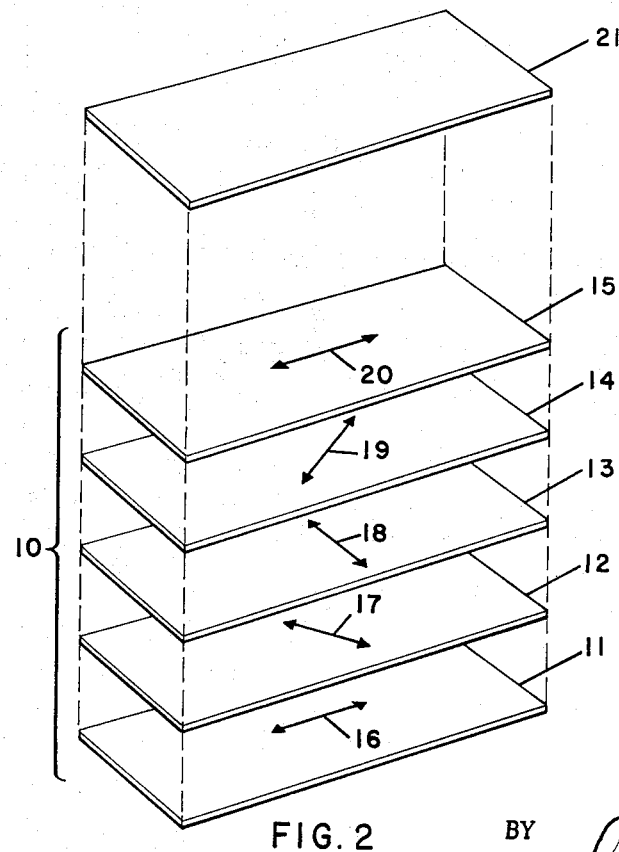
FIG. 2 is a schematic exploded view of plate made by the process of the invention.

FIG. 2 shows an exploded view of a composite plate mirror as produced by Step 5 shown in FIG. 1.

The basic composite plate, generally designated 10, is made up of preforms 11–15, bonded together by a suitable adhesive (not shown). Each preform 11–15 has a direction of maximum fiber strength across its surface, illustrated by arrows 16–20. These preforms 11–15 are bonded together in a pseudoisotropic arrangement to produce a plate 10 with an optimum balance of physical characteristics in all directions. Thus, in the lay-up illustrated, preforms 11–15 are arranged with strength directions at 0°, +45°, 90°, −45° and 0° as illustrated by arrows 16–20.

After plate 10 is completed, a reflective layer 21 is formed on the upper surface of plate 15 by any suitable technique. Typically, this layer 21 may comprise a 0.010 to 0.030 layer of fused silica which is ground, polished and coated with a thin reflective nickel coating.

DESCRIPTION OF PREFERRED EMBODIMENTS

Details of several preferred embodiments of the process of this invention will be further understood upon reference to the following examples. All parts and percentages are by weight unless otherwise indicated.

EXAMPLE I

A "prepreg" sheet material, Courtland's HM-S, made up of a plurality of high-Young's-modulus graphite fibers impregnated with 4617/DDM epoxy resin from Union Carbide, is cut into about 8 inch diameter disks. This sheet material contains sufficient fiber content to give a cured ply thickness of about 0.002 inch. Preforms are prepared by stacking eight of the disks with a unidirectional fiber orientation, then curing the preforms at 350° F for 2 hours under vacuum-augmented autoclave pressure. Eight preforms are then stacked so that from top to bottom they have the following angular fiber orientation: 0/+45/−45/90/−45/+45/0. The preform interfaces are coated with EC–2216, a filled epoxypolyamide adhesive from the 3M Company. The stack of preforms is pressed between ground steel plates having a flatness tolerance of ±0.0005 inch. Thickness of the bondline is kept to less than 0.002 inch and the total thickness of the resulting laminated plate is about 0.142 inch. Bonding is accomplished using pressure and shims of the proper thickness around the stack to control final plate thickness. The bonded composite plate is cured for 24 hours at room temperature, then for 2 hours at 150° F. A layer of fused silica having a thickness of about 0.03 inch is bonded to the composite plate. Finally, the fused silica is ground optically flat and a thin reflective coating of nickel is applied by vacuum evaporation. The resulting mirror is especially suitable for X-ray optical devices in a vacuum.

EXAMPLE II

A "prepreg" sheet as described in Example I is subdivided into a number of preform sets of six 10 inch by 12 inch rectangular sheets, the plies in each preform having the following order of fiber orientation: 0/+45/−45/+45/0. The sheets making up each preform are thus stacked, then the preforms are cured for about 2 hours at about 350° F under vacuum augmented autoclave pressure. Four preforms are then bonded together with Shell Chemical Corporation's Epon 934 filled epoxy adhesive to produce a final composite plate having three bondlines, each less than 0.002 inch thick. Bonding is done between ground steel plates having a flatness tolerance of about 0.0005, using shims to set the final plate thickness at 0.054 inch. The plate is then cured for 24 hours at room temperature followed by about 2 hours at about 150° F. An about 0.03 inch-thick layer of fused silica is bonded to the composite plate. After optically grinding the silica layer, thin coatings of silicon monoxide, aluminum and silicon monoxide are applied by vacuum evaporation. The resulting mirror is suitable for use in infrared or visible light regions.

EXAMPLE III

The "prepreg" to be used is Morganite's Type I, high-modulus graphite fiber impregnated with Fiberete's C-904 epoxy resin formulation, where the fiber has been spread to a thickness which will give a cured sheet thickness of about 0.0005 inch. Four pseudoisotropic preforms are prepared where each preform is made up of eight 10 inch by 12 inch rectangular sheets having the following fiber orientation: 0/+45/−45/90/90/−45/+45/0. Each preform is cured for a minimum of 2 hours at about 375° F under vacuum augmented autoclave pressure. The four preforms are then bonded together with Crest's 7343 polyurethane adhesive to get a final plate having three bondlines, each less tha about 0.002 inch thick. The preforms are bonded between very flat steel plates, using shims to assure a final composite plate thickness of about 0.166 inch. The bonds are then cured for at least about 12 hours at room temperature. A cast epoxy resin sheet having a thickness of about 0.03 inch is bonded to the composite plate. The epoxy sheet is ground optically flat, then coated with thin layers of silicon monoxide, aluminum and silicon monoxide. The resulting mirror is highly suitable for use in the infrared region.

EXAMPLE IV

A "prepreg" is prepared consisting of Courtland's HT-S high strength graphite fibers impregnated with Plockton 951 polyester resin from Allied Chemical. The fibers are arranged to give a cured sheet thickness of about 0.007 inch. Two 10 inch by 12 inch rectangular pseudoisotropic preforms are prepared, each made up of six plies with the following fiber orientation: 0/+60/−60/−60/+60/0. Each preform is cured in a vacuum autoclave for at least about 2 hours at about 325° F. The preforms are bonded together between flat plates using Eastman HE-97 polyester resin from Eastman Chemical Products. Shims determined the final composite plate thickness at 0.084 inch. The bond is cured for at least about 4 hours at room temperature. A 0.03 inch layer of epoxy resin is formed on one surface of the composite plate and cured. The layer is then optically ground and overcoated with thin layers of silicon monoxide, aluminum and silicon monoxide by vacuum deposition. An excellent mirror for infrared use results.

EXAMPLE V

A "prepreg" sheet is prepared by impregnating Hercules Type A graphite fiber with Monsanto's SC-1008 phenolic resin, with the fibers spread to give a cured sheet thickness of about 0.005 inch. Four pseudoisotropic preforms are laid up on ground steel spherical molds. Each preform is made up of 14 plies having the following order of fiber orientation: 0/+45/+60/90/−60/−45/0/0/−45/−45/−60/90/+60/+45/0. Each preform is cured for at least about 2 hours at about 350° F under vacuum bag pressure. The preforms are then bonded together with Lefkoweld's Type 109 epoxy adhesive to produce a panel with bondline thicknesses of less than about 0.0002 inch. Bonding is accomplished between two matching ground steel spherical molds having a contour tolerance of about ±0.0005 inch, using shims to produce a final panel thickness of about 0.216 inch. The bonds are then cured for at least about 1 hour at about 150° F. A layer of nickel is then chemically plated on the concave panel surface, then processed to a highly accurate spherical configuration. The spherical mirror which results is highly accurate and suitable for X-ray use.

EXAMPLE VI

A "prepreg" sheet is prepared using Whittaker-Morgan's Modmor I high-modulus graphite fibers impregnated with Monsanto's RS-6234 polyimide resin. The fibers are arranged so as to give a cured sheet thickness of about 0.005 inch. Two preforms are prepared, each of which is made up of eight sheets having the following fiber orientation: 0/+45/90/−45/−45/90/+45/0. Each preform is cured for at least about 2 hours at 350° F under vacuum-augmented autoclave pressure. The two preforms are bonded together with Armstrong's A-4 aluminum-filled epoxy adhesive. The sheets are bonded between flat steel plates using shims to give a final composite plate thickness of about 0.082 inch, with an about 0.002 inch bondline. After curing the plate for about 12 hours at room temperature, a thin CER–VIT sheet is bonded to the plate. The CER–VIT sheet is ground optically flat and a thin coating of reflective nickel is applied by vacuum evaporation. This highly flat mirror is useful in X-ray devices in a vacuum.

EXAMPLE VII

A "prepreg" material is prepared by impregnating a sheet of woven graphite fiber with a polyimide resin. The sheet has a cured thickness of about 0.002 inch. The sheet is cut into a number of 6 inch diameter disks. While the fibers are woven, the disks do have greatest strength in one direction. Five preforms are prepared by stacking eight of the disks with the primary strength direction oriented as follows: 0/+45/−45/90/−45/+45/0. The preforms are then cured at 400° F for 3 hours under pressure against a highly accurate spherically curved steel surface. The preforms are then coated with EC-2216, a filled epoxy-polyimide adhesive from the 3M Company. Five preforms are stacked on the spherically curved steel surface with the primary strength direction of the top sheet in each preform oriented as follows: 0/+45/90/−45/0. A complementary spherically curved steel surface is then pressed against the stack and the adhesive is cured for 24 hours at room temperature, then for 2 hours at 150° F. The resulting plate is found to have a highly accurate spherical surface and to have very uniform thickness.

Although specific materials, and process variables are specified in the above description of preferred embodiments, these may be varied as described above with similar results. In addition, other ingredients may be included in the fiber sheets, impregnating resin, preform bonding agent, surface coatings, etc. in order to modify or enhance desired properties of the system.

Various modifications, ramifications and applications of the present invention will occur to those skilled in the art upon reading this specification. These are intended to be included within the scope of this invention, as defined in the appended claims.

I claim:

1. A method of preparing composite structures of highly uniform thickness which comprise the steps of:
   providing a plurality of thin sheets each comprising unidirectionally oriented graphite fibers impregnated with a synthetic resin:
   preparing a plurality of preforms by assembling a plurality of stacks each having from two to 20 sheets arranged in a selected first orientation;
   pressing each stack against a shaping surface while curing said resin;
   assembling a plurality of said preforms in a stack with adhesive interlayers therebetween, said preforms arranged in a selected second orientation;
   at least one of said first and second orientations being pseudoisotropic, and
   bonding said preforms together while pressing said preforms between a pair of parallel surfaces, each of which has substantially the same configuration as said first surface, whereby a plate of highly uniform thickness is produced.

2. The method according to claim 1 wherein said first orientation is pseudoisotropic.

3. The method according to claim 1 wherein said second orientation is pseudoisotropic.

4. The method according to claim 1 wherein both said first and said second orientations are pseudoisotropic.

5. The method according to claim 1 wherein all of said surfaces are substantially flat, whereby the plate produced is extremely flat.

6. The method according to claim 1 wherein from 2 to 10 sheets are assembled to make each preform and form 2 to 10 preforms are assembled to make said plate.

7. The method according to claim 6 wherein said plate is formed to a thickness of from about 0.05 inch to about 0.25 inch.

8. The method according to claim 1 wherein each sheet has a thickness of from about 0.001 inch to about 0.01 inch and each plate contains from about 12 sheets to about 100 sheets.

9. The method according to claim 1 including the further step of forming a highly reflective layer on at least one plate surface.

10. The method according to claim 1 wherein shims are placed between said parallel surfaces adjacent to the preforms to maintain desired plate and adhesive bondline thicknesses.

11. A method of preparing thin, flat composite plates which comprises the steps of:
   a. providing a plurality of sheets each comprising unidirectionally oriented graphite fibers impregnated with a synthetic resin;
   b. stacking from two to 10 of said sheets on a first substantially flat plate surface in a selected first fiber orientation;
   c. curing said resin to produce a rigid preform;
   d. repeating steps (b) and (c) to produce at least one additional substantially identical preform;
   e. stacking from two to 10 of said preforms in a selected second fiber orientation on a second substantially flat shaping surface with adhesive interlayers between said preforms;
   f. at least one of said first and second orientations being pseudoisotropic; and
   g. curing said adhesive while pressing said stack with a third substantially flat shaping surface which is maintained substantially parallel to said second surface and space a selected distance therefrom, whereby a highly flat and uniformly thick composite plate is produced.

12. The method according to claim 11 wherein said first orientation is pseudoisotropic.

13. The method according to claim 11 wherein said second orientation is pseudoisotropic.

14. The method according to claim 11 wherein said first and second orientations are pseudoisotropic.

15. The method according to claim 11 wherein said plate is formed to a thickness of from about 0.05 inch to about 0.25 inch.

16. The method according to claim 11 wherein each sheet has a thickness of from about 0.001 inch to about 0.01 inch and each plate contains from about 12 sheets to about about 100 sheets.

17. The method according to claim 11 including the further step of forming a highly reflective layer on at least one plate surface.

18. The method according to claim 11 wherein said preforms are stacked so that fiber orientations are substantially identical on each side of a plane through the center of said plate parallel to the plate surfaces.

* * * * *